US011634558B2

(12) United States Patent
Namiki et al.

(10) Patent No.: US 11,634,558 B2
(45) Date of Patent: Apr. 25, 2023

(54) OPTICAL RESIN MATERIAL FOR CHROMATIC ABERRATION CORRECTION

(71) Applicant: MITSUBISHI GAS CHEMICAL COMPANY, INC., Tokyo (JP)

(72) Inventors: Kosuke Namiki, Tokyo (JP); Sunao Nojima, Tokyo (JP); Shoko Suzuki, Chiba (JP); Noriyuki Kato, Tokyo (JP); Hiroshi Horikoshi, Chiba (JP)

(73) Assignee: MITSUBISHI GAS CHEMICAL COMPANY, INC., Tokyo (JP)

(*) Notice: Subject to any disclaimer, the term of this patent is extended or adjusted under 35 U.S.C. 154(b) by 268 days.

(21) Appl. No.: 16/761,131

(22) PCT Filed: Dec. 17, 2018

(86) PCT No.: PCT/JP2018/046253
§ 371 (c)(1),
(2) Date: May 1, 2020

(87) PCT Pub. No.: WO2019/131258
PCT Pub. Date: Jul. 4, 2019

(65) Prior Publication Data
US 2020/0270421 A1 Aug. 27, 2020

(30) Foreign Application Priority Data
Dec. 28, 2017 (JP) .............................. JP2017-253318

(51) Int. Cl.
*C08K 5/3492* (2006.01)
*C08L 33/10* (2006.01)
*G02B 1/04* (2006.01)
*G02B 27/00* (2006.01)

(52) U.S. Cl.
CPC ............ *C08K 5/3492* (2013.01); *C08L 33/10* (2013.01); *G02B 1/04* (2013.01); *G02B 27/0025* (2013.01)

(58) Field of Classification Search
CPC .... C08L 33/10; C08L 101/00; C08L 2666/70; C08L 33/06; C08L 33/14; G02B 1/04; G02B 27/0025; C08F 2/44; C08F 20/34; C08F 222/102; C08F 226/06; C08K 5/3475; C08K 5/3492
USPC ....................................................... 524/100
See application file for complete search history.

(56) References Cited

U.S. PATENT DOCUMENTS

| 4,528,311 A | 7/1985 | Beard et al. |
| 5,684,636 A | 11/1997 | Chow et al. |

| 2002/0045702 | A1* | 4/2002 | Nakamura | ............... C07C 69/54 524/832 |
| 2003/0225181 | A1* | 12/2003 | Liao | ....................... C08F 220/54 523/106 |
| 2008/0130129 | A1 | 6/2008 | Boden et al. | |
| 2009/0143560 | A1 | 6/2009 | Hatanaka et al. | |
| 2010/0238540 | A1 | 9/2010 | Miyakawa | |
| 2012/0330052 | A1 | 12/2012 | Saitoh | |
| 2015/0175731 | A1 | 6/2015 | Saitoh | |
| 2018/0080149 | A1 | 3/2018 | Ito | |

FOREIGN PATENT DOCUMENTS

| JP | 60-38411 | | 2/1985 | |
| JP | 2004-345123 | | 12/2004 | |
| JP | 2005-225990 | | 8/2005 | |
| JP | 2008-158361 | | 7/2008 | |
| JP | 2010-037470 | | 2/2010 | |
| JP | 2011-068708 | | 4/2011 | |
| JP | 2011-136961 | | 7/2011 | |
| JP | 2011-195549 | | 10/2011 | |
| JP | 2014-043565 | | 3/2014 | |
| KR | 2017112555 A | * | 10/2017 | ............... C08J 5/18 |
| WO | 2007/055390 | | 5/2007 | |
| WO | 2009/038134 | | 3/2009 | |
| WO | 2018/181183 | | 10/2018 | |

OTHER PUBLICATIONS

KR 2017-0112555 A, machine translation, EPO espacenet. (Year: 2017).*
"CAS Registry No. 96478-09-0," CAS SciFindern. American Chemical Society. (Year: 2022).*
Official Communication (ISR) dated Mar. 12, 2019 in International Application No. PCT/JP2018/046253.

* cited by examiner

*Primary Examiner* — Frances Tischler
(74) *Attorney, Agent, or Firm* — Greenblum & Bernstein, P.L.C.

(57) ABSTRACT

An optical resin material for chromatic aberration correction is provided including at least 5% by mass of a compound (component A) represented by formula (1) or formula (3), in which $R_1$ to $R_6$ each independently represent a structure represented by formula (2), in which the broken line represents a binding site; n1 represents an integer of 0 to 3; n2 represents an integer of 0 or 1; n3 represents an integer of 0 to 4; $R_7$ represents hydrogen, an acryl group, a methacryl group, a cyanoacryl group, a cyclic ether group, an allyl group, a propargyl group, a hydroxy group, an isocyanate group, chlorine, or an optionally branched alkyl group having 1 to 8 carbon atoms; and X represents an alkylene glycol chain having 2 to 7 carbon atoms or a lactone-modified ketone chain, in which $R_1$ to $R_6$ each independently represent a structure represented by formula (2).

5 Claims, 1 Drawing Sheet

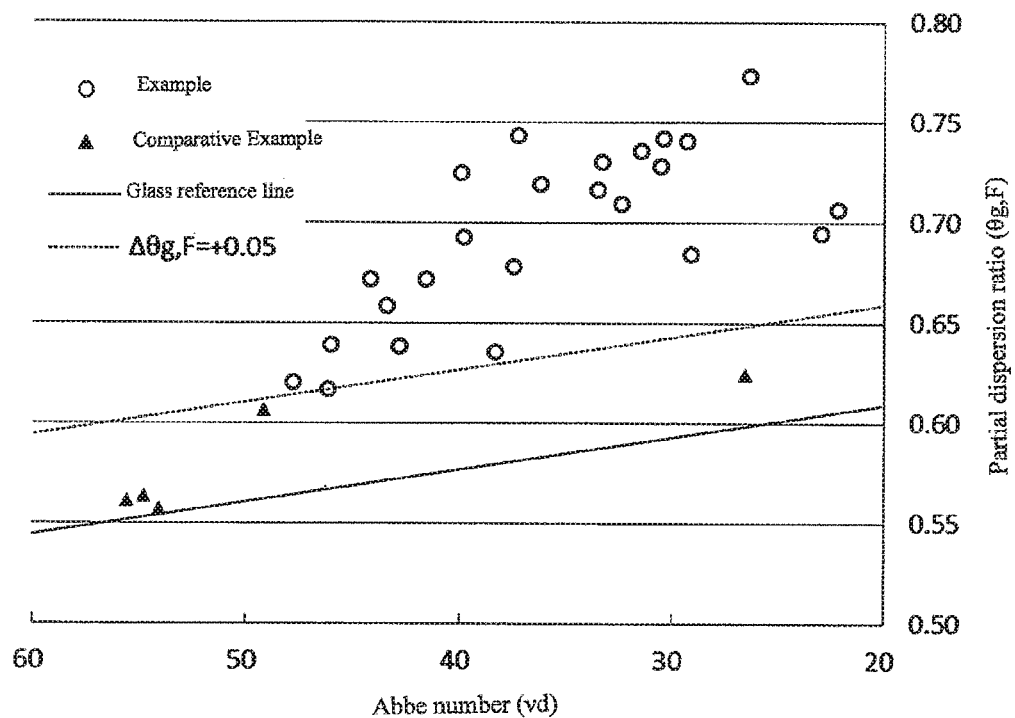

OPTICAL RESIN MATERIAL FOR CHROMATIC ABERRATION CORRECTION

TECHNICAL FIELD

The present invention relates to an optical resin material having high refractive index anomalous dispersion characteristics and high chromatic aberration correction function.

BACKGROUND ART

In general, in dioptric systems, a main lens having low refractive index wavelength dispersion characteristics (high Abbe number (vd)) is combined with a lens of opposite power having high refractive index wavelength dispersion characteristics (low Abbe number) to cancel a primary component (inclination component) of refractive index wavelength dependence, thereby correcting chromatic aberration. However, since refractive index wavelength dependence of materials constituting lenses is generally non-linear, when the aforementioned simple correction is made, a higher order component, in particular, wavelength dependence in a short wavelength region remains.

For this reason, in the case of applications requiring more precise chromatic aberration correction, correction is carried out, for example, by utilizing various types of lens materials. In this regard, by using an optical material having anomalous dispersion characteristics, wherein the refractive index in a short wavelength region is different from those of conventional materials and the partial dispersion ratio in the blue range is high, chromatic aberration can be corrected efficiently.

The above-described optical material for chromatic aberration correction is preferably a resin material from the viewpoint of moldability, lightweight properties, mass productivity, etc. As resin materials having high anomalous dispersion characteristics, a carbazole-based compound, a benzophenone-based compound, a hetero-containing compound, a phenyl sulfone-based compound, a fluorene-based compound and an inorganic fine particle-dispersed resin have been reported (Patent Documents 1-5), but all of these materials have problems regarding low colorability, light resistance, moldability, etc.

PRIOR ART DOCUMENTS

Patent Documents

Patent Document 1: Japanese Laid-Open Patent Publication No. 2008-158361
Patent Document 2: Japanese Laid-Open Patent Publication No. 2011-195549
Patent Document 3: Japanese Laid-Open Patent Publication No. 2011-136961
Patent Document 4: Japanese Laid-Open Patent Publication No. 2010-037470
Patent Document 5: Japanese Laid-Open Patent Publication No. 2014-43565

SUMMARY OF THE INVENTION

Problems to be Solved by the Invention

The problem of the present invention is to provide an optical resin material having high refractive index anomalous dispersion characteristics and high chromatic aberration correction function.

Note that the Abbe number (vd) and the secondary dispersion characteristics (θg,F) are represented by formulae below $$vd=(nd-1)/(nF-nC)$$

$$\theta g,F=(ng-nF)/(nF-nC)$$

(nd, nF, nC and ng represent refractive indexes at wavelengths of 587.6 nm, 486.1 nm, 656.3 nm and 435.8 nm, respectively.)

Further, anomalous dispersion characteristics of secondary dispersion can be numerically evaluated based on the distance from a straight line obtained by binding two types of normal glasses NSL7 and PBM2 ((vd, θg,F)=(60.49, 0.5436), (36.26, 0.5828)) (hereinafter referred to as the glass reference line). in this specification, a value obtained by subtracting a value of θg,F of the glass reference line with the same Abbe number from a value of θg,F of the optical material was defined as Δθg,F, and it was used for evaluation of the degree of anomalous dispersion characteristics,

Means for Solving the Problems

The present inventors diligently made researches in order to solve the above-described problem and found that a compound having a specific structure has high refractive index anomalous dispersion characteristics, low colorability and high light resistance. Specifically, the present invention is as described below.

[1] An optical resin material for chromatic aberration correction, comprising at least 5% by mass of a compound (component A) represented by general formula (1) or general formula (3):

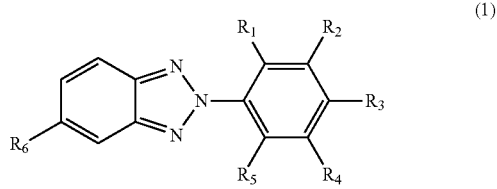

wherein $R_1$ to $R_6$ each independently represent a structure represented by general formula (2):

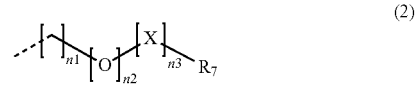

wherein:
the broken line represents a binding site;
n1 represents an integer of 0 to 3;
n2 represents an integer of 0 or 1;
n3 represents an integer of 0 to 4;
$R_7$ represents hydrogen, an acryl group, a methacryl group, a cyanoacryl group, a cyclic ether group, an allyl group, a propargyl group, a hydroxy group, an isocyanate group, chlorine, or an optionally branched alkyl group having 1 to 8 carbon atoms; and
X represents an alkylene glycol chain having 2 to 7 carbon atoms or a lactone-modified ketone chain.

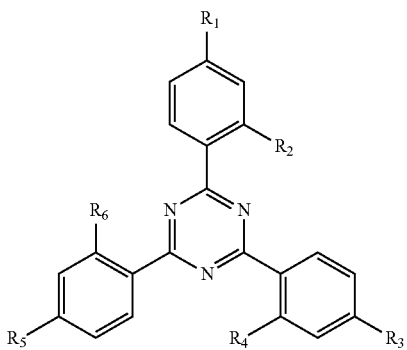

(3)

wherein $R_1$ to $R_6$ each independently represent a structure represented by general formula (2).

[2] The optical resin material for chromatic aberration correction according to item [1], wherein the component A has at least one acryl group or methacryl group as a polymerizable group.

[3] The optical resin material for chromatic aberration correction according to item [1], wherein the component A is 2-[2-hydroxy-5-[2-(methacryloyloxy)ethyl]phenyl]-2H-benzotriazole or 3-(2H-benzotriazol-2-yl)-4-hydroxyphenyl methacrylate.

[4] The optical resin material for chromatic aberration correction according to any one of items [1] to [3], wherein the ratio of the component A is 10 to 30% by mass.

[5] The optical resin material for chromatic aberration correction according to any one of items [1] to [4], which further comprises a polymerizable composition (component B) at a ratio of 50% by mass to 95% by mass.

[6] An optical element obtained by curing the optical resin material for chromatic aberration correction according to any one of items [1] to [5].

[7] The optical element according to item [6], wherein at least one surface thereof is in contact with another optical element.

Advantageous Effect of the Invention

By using the optical resin material of the present invention having high refractive index anomalous dispersion characteristics, it is possible to provide an optical element excellent in low colorability and weather resistance, wherein chromatic aberration is small in a wide wavelength range, with good productivity. As a result, chromatic aberration of optical systems such as lenses can be corrected efficiently, and size reduction and cost reduction of optical systems can be expected.

BRIEF DESCRIPTION OF THE DRAWINGS

FIG. 1 is a graph showing the relationship between θg,F and the Abbe number of optical elements produced in the Examples and Comparative Examples.

EMBODIMENTS FOR CARRYING OUT THE INVENTION

The optical resin material of the present invention comprises a benzotriazole-based compound represented by general formula (1) or a phenyltriazine-based compound represented by general formula (3) (hereinafter referred to as the component A). Hereinafter, these substances will be described in detail.

[Component A: Benzotriazole-Based Compound (Formula (1)) or Phenyltriazine-Based Compound (Formula (3))]

<Benzotriazole-Based Compound>

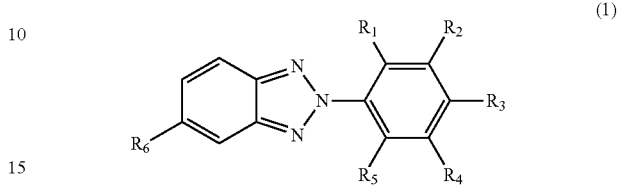

(1)

(In the formula, $R_1$ to $R_6$ each independently represent a structure represented by general formula (2).)

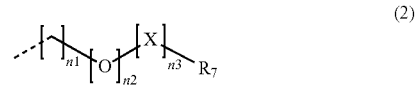

(2)

(In the formula:
the broken line represents a binding site;
n1 represents an integer of 0 to 3, and preferably 0 or 1;
n2 represents an integer of 0 or 1, and preferably 1;
n3 represents an integer of 0 to 4, and preferably an integer of 0 to 3;
$R_7$ represents hydrogen, an acryl group, a methacryl group, a cyanoacryl group, a cyclic ether group, an allyl group, a propargyl group, a hydroxy group, an isocyanate group, chlorine, or an optionally branched alkyl group having 1 to 8 carbon atoms, and preferably represents hydrogen, an acryl group, a methacryl group or an alkyl group; and
X represents an alkylene glycol chain having 2 to 7 carbon atoms or a lactone-modified ketone chain, and preferably represents an ethylene glycol chain or a propylene glycol chain.)

<Phenyltriazine-Based Compound>

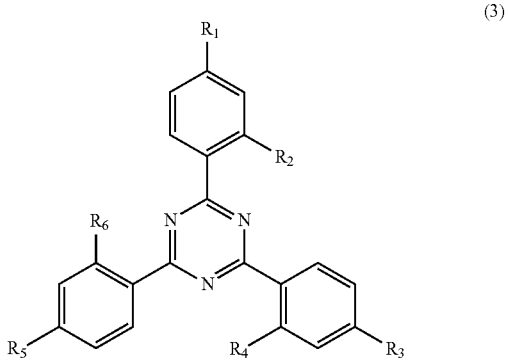

(3)

(In the formula, $R_1$ to $R_6$ each independently represent a structure represented by general formula (2).)

The benzotriazole-based compound or phenyltriazine-based compound has the effect of improving refractive index anomalous dispersion characteristics, and these compounds may be used solely or in combination.

Specific examples of the benzotriazole-based compound include 2-(2-hydroxy-5-methylphenyl)benzotriazole, 2-(5-chloro-2-benzotriazolyl)-6-tert-butyl-p-cresol, 2-(2-hydroxy-5-tert-butylphenyl)benzotriazole, 2-(2-hydroxy-5-tert-octylphenyl)benzotriazole, 2-(2H-benzotriazolyl-2-yl)-6-dodecyl-4-methylphenol, C7-C9-alkyl-3-[3-(2H-benzotriazol-2-yl)-5-(1,1-dimethylethyl)-4-hydroxyphenyl] propione ether, 2-[2-hydroxy-3,5-bis(α,α-dimethylbenzyl)phenyl]-2H-benzotriazole, 2-(4,6-diphenyl-1,3,5-triazin-2-yl)-5-[(hexyl)oxy]-phenol, 2-(2H-benzotriazolyl-2-yl)-6-(1-methyl-1-phenylethyl)-4-(1,1,3,3-tetramethylbutyl)phenol, 2-[2-hydroxy-5-[2-(methacryloyloxy)ethyl]phenyl]-2H-benzotriazole and 3-(2H-benzotriazol-2-yl)-4-hydroxyphenyl methacrylate. From the viewpoint of reduction in bleed-out properties and improvement of the strength and heat resistance of optical resin, it is preferably a compound having a polymerizable functional group (e.g., at least one polymerizable functional group consisting of an acryl group, a methacryl group, a cyanoacryl group, an epoxy group, an allyl group, a propargyl group, a hydroxy group and an isocyanate group), and it is particularly preferably a compound having at least one acryl group or methacryl group. Specifically, 2-[2-hydroxy-5-[2-(methacryloyloxy)ethyl]phenyl]-2H-benzotriazole and 3-(2H-benzotriazol-2-yl)-4-hydroxyphenyl methacrylate are preferred.

Specific examples of the phenyltriazine-based compound include 2-[4-([2-hydroxy-3-(-2'-ethyl)hexyl)oxy]-2-hydroxyphenyl]-4,6-bis(2,4-dimethylphenyl)-1,3,5-triazine and 2,4-bis(2-hydroxy-4-butyloxyphenyl)-6-(2,4-bis-butyloxyphenyl)-1,3,5-triazine.

The ratio of the component A in the optical resin material is preferably 5% by mass or more, and more preferably 10% by mass or more, and refractive index anomalous dispersion characteristics Δθg,F can be improved. In particular, it is preferred to adjust the amount of the component A so that Δθg,F becomes 0.05 or more because the effect of chromatic aberration correction is improved in this case. In the case where the component A does not have any polymerizable functional group and is a low-molecular-weight compound having a molecular weight of less than 1000, since there is concern for bleeding out from optical resin and reduction in the strength of resin, the ratio is preferably 30% by mass or less.

In the case where the component A is a compound having a polymerizable functional group, the component A may be directly added to resin, or oligomerized or polymerized by a chemical reaction in advance and then used. An oligomer or polymer can be produced by a general technique. For example, in the case of a compound having a methacryl group, a homopolymer or a copolymer with a double-bond compound such as styrene/butadiene is obtained by radical polymerization.

[Component B: Polymerizable Composition]

The polymerizable composition other than the component A that can be used in the present invention is not particularly limited as long as it is a resin that can be mixed with the component A. Specific examples thereof include methacrylic compounds such as ethyl methacrylate, n-butyl methacrylate, phenoxyethyl methacrylate, ethylene glycol dimethacrylate, polyethylene glycol dimethacrylate, 1,6-hexanediol dimethacrylate and dimethylol-tricyclodecane dimethacrylate, acrylic compounds such as phenoxyethyl acrylate, polyethylene glycol diacrylate, dimethylol-tricyclodecane diacrylate, pentaerythritol tetraacrylate, dipentaerythritol hexaacrylate and ethoxylated bisphenol A diacrylate, ethylene glycol diglycidyl ether, trimethylolpropane triglycidyl ether, hydrogenated bisphenol A diglycidyl ether, and an epoxidized product of 3',4'-epoxycyclohexylmethyl 3,4-epoxycyclohexanecarboxylate. In the case where the component A has a polymerizable functional group, it is preferred to use a resin that copolymerizes with the functional group of the component A as a component to be mixed because homogeneity of a material at the time of molding an optical resin obtained is improved. More specifically, in the case where the component A has a (meth)acryl group as a polymerizable functional group, the component B preferably has a (meth)acryl group, aryl group or thiol group which copolymerizes therewith.

The ratio of the component B in the optical resin material is preferably 50% by mass to 95% by mass, more preferably 70% by mass to 95% by mass, and particularly preferably 80% by mass to 95% by mass.

[Other Components]

To the optical resin material of the present invention, a polymerization inhibitor, an antioxidant, a light stabilizer (HALS), an ultraviolet absorber, a silane coupling agent, a mold release agent, a pigment, a dye and a plasticizer can be added according to need.

[Optical Resin Material]

The optical resin material of the present invention is obtained by homogeneously mixing components by a usual means. A resin material after mixing may be subjected to filtration, defoaming or the like according to need.

[Optical Element]

The optical element of the present invention is molded by using the above-described optical resin material. The molding method thereof is not particularly limited, and it can be produced according to a publicly-known technique. For example, Patent Document 4 describes a technique in which an optical element is prepared by molding a resin having high anomalous dispersion characteristics on a glass lens surface or between glass lenses. The molding technique can be suitably selected from cast photopolymerization, cast thermal polymerization, etc. depending on characteristics of the component A and the other resin components. The optical element of the present invention includes a lens, a minor, a prism and a filter, but it is preferably used as a lens. It is preferred to employ a constitution in which at least one surface is in contact with another optical element, and it is particularly preferred that both the surfaces are in contact with other optical elements (particularly lenses).

EXAMPLES

Hereinafter, the present invention will be specifically described based on working examples, but embodiments can be suitably changed within a range in which the effects of the present invention are exerted.

The manufacturers of the compounds used in the working examples are shown below.

[Component A]

Tinuvin P/PS/326/3291571 (benzotriazole derivative): BASF Japan Ltd.

Tinuvin 479 (phenyltriazine derivative): BASF Japan Ltd.

2-[2-hydroxy-5-[2-(methacryloyloxy)ethyl]phenyl]-2H-benzotriazole (product name: RUVA-93): Otsuka Chemical Co., Ltd.

2-[2-hydroxy-4-4 octyloxyphenyl]-2H-benzotriazol-5-yloxy]ethyl methacrylate (product name: SEESORB R18) homopolymer (Mn: 4200, Mw: 11200): Shipro Kasei Kaisha Ltd. SEESORB S31 homopolymer (homopolymer of benzotriazole-based acrylic compound, Mn: 4700, Mw: 9000): Shipro Kasei Kaisha Ltd.

[Component B]
1,6-hexanediol dimethacrylate (product name: 1.6HX): Kyoeisha Chemical Co., Ltd.
Ethylene glycol dimethacrylate (product name: EG): Kyoeisha Chemical Co., Ltd.
EO-modified diglycerin tetraacrylate (product name: DGE-4A): Kyoeisha Chemical Co., Ltd.
Fluorene acrylate (product name: F-5710): Osaka Gas Chemicals Co., Ltd.
[Polymerization Initiator]
t-butyl peroxybenzoate (product name: PERBUTYL Z): NOF Corporation
2,4,6-trimethylbenzoyl-diphenyl-phosphine oxide (product name: IrgaCureTPO): BASF Japan Ltd.

Analysis and evaluation were carried out according to the below-described methods.

[Refractive Index (nd) and Abbe Number (vd)]

The refractive index (nd) and the Abbe number (vd) of the optical resin material were measured according a method in which the optical resin material before curing was sandwiched between two slide glasses (S9213 manufactured by Matsunami Glass Ind., Ltd.), cured to have a thickness of 1 mm, and then cut at a right angle and polished, and subjected to the measurement using a precision refractometer KPR-2000 (manufactured by Shimadzu Device Corporation). The measurement temperature was 25° C.

[Anomalous Dispersion Characteristics]

A value obtained by subtracting a value of $\theta g,F$ of a glass reference line with the same Abbe number from a value of $\theta g,F$ of the optical material was defined as $\Delta\theta g,F$, and it was used for evaluation of the degree of anomalous dispersion characteristics.

$$vd=(nd-1)/(nF-nC)$$

$$\theta g,F=(ng-nF)/(nF-nC)$$

(nd, nF, nC and ng represent refractive indexes at wavelengths of 587.6 nm, 486.1 nm, 656.3 nm and 435.8 nm, respectively.)

Glass reference line: a straight line obtained by binding two types of normal glasses NSL7 and PBM2 ((vd, $\theta g,F$)=(60.49, 0.5436), (36.26, 0.5828))

The case where $\Delta\theta g,F>0.05$ was regarded as acceptable.

[Colorability]

Colorability of the optical resin material was evaluated based on the hue at the time of molding it into a plate-like shape having a thickness of 1 mm. The product which was colorless or pale yellow (low colorability) was evaluated as "good", and the product which was significantly yellowed was evaluated as "colored".

Synthesis Example 1

Synthesis of 2-(2H-benzotriazol-2-yl)-4-methylphenyl methacrylate (A-1)

Under nitrogen, 22.7 g (0.1 mol) of 2-(2H-benzotriazol-2-yl)-4-cresol (Tinuvin P) was dissolved in 300 mL of 1,2-dichloroethane (dehydrated), and 10.6 g (0.105 mol) of triethylamine was added thereto to obtain a homogeneous solution. It was cooled in an ice bath while stirring, and 15.7 g (0.15 mol) of methacrylic acid chloride was added dropwise thereto over 1 hour. Stirring was continued at room temperature for 20 hours, and then an organic layer was washed with 100 mL of ion-exchanged water (separated three times), and drying was carried out using sodium sulfate. After that, a volatile component was distilled away, thereby obtaining a white solid. It was purified by silica gel column chromatography; thereby obtaining 23.0 g (0.078 mol, 78%) of 2-(2H-benzotriazol-2-yl)-4-methylphenyl methacrylate.

Synthesis Example 2

Synthesis of 2-([{3-(2H-benzotriazol-2-yl)-4-hydroxyphenethoxy}carbonyl]amino)ethyl methacrylate (A-2)

Under nitrogen, 6.24 g (containing MIBK (21%), 0.0193 mol) of 2-(2H-benzotriazol-2-yl)-4-(2-hydroxyethyl)phenol was dissolved in 80 mL of ethyl acetate, then 0.0007 g (0.000003 mol) of dibutyl hydroxy toluene (BHT) and 0.0196 g (0.0000310 mol) of dibutyltin laurate (DBTDL) were added thereto, and the mixture was heated to about 40° C. to obtain a homogeneous solution. Stirring was continued at room temperature and 2.90 g (0.0187 mol) of 2-isocyanatoethyl methacrylate (KarenzMOI, manufactured by Showa Denko K.K.) was added dropwise thereto. The mixture was stirred at room temperature for 2.5 hours and at 35° C. for 1 hour, and then allowed to stand at room temperature for 15 hours. The mixture was stirred at 40° C. for 6 hours and at 50° C. for 2 hours, and then cooled to room temperature, resulting in precipitation of a light brown solid. Separation was carried out by means of suction filtration, the solid was washed with ethyl acetate, and then a volatile component was distilled away, thereby obtaining 1.45 g of 2-([{3-(2H-benzotriazol-2-yl)-4-hydroxyphenethoxy}carbonyl]amino)ethyl methacrylate as a light brown solid.

Example 1

5% by mass of 2-(2-hydroxy-5-t-butylphenyl)-2H-benzotriazole (Tinuvin PS) (A-3), 95% by mass of 1,6-hexanediol dimethacrylate (1.6HX) and 0.1% by mass of t-butyl peroxybenzoate (PERBUTYL Z) were mixed together until the mixture became homogeneous, thereby obtaining an optical resin material.

A fluororubber O ring having a thickness of 1 mm was fixed by being sandwiched between two glass plates, and the optical resin material was injected into the O ring. This was heated at 100° C. for 48 hours to be cured, thereby obtaining a transparent resin plate having good low colorability. The refractive index of the obtained resin plate was measured, and the refractive index anomalous dispersion characteristics were evaluated. The results are shown in Table 1.

Examples 2-21

The operation was carried out in a manner similar to that in Example 1, except that the compounds used as the component A and the component B and the amounts thereof (% by mass) were as shown in Table 1, thereby obtaining a transparent resin plate having good low colorability. The refractive index of the obtained resin plate was measured, and the refractive index anomalous dispersion characteristics were evaluated. When the solubility of the component A at room temperature was insufficient, heating was appropriately performed, thereby preparing a homogeneous solution. The results are shown in Table 1.

Example 22

5% by mass of 2-[2-hydroxy-5-[2-(methacryloyloxy)ethyl]phenyl]-2H-benzotriazole (RUVA-93), 95% by mass of 1,6-hexanediol dimethacrylate (1.6HX) and 0.5% by mass of 2,4,6-trimethylbenzoyl-diphenyl-phosphine oxide (IrgaCureTPO) were mixed together until the mixture became homogeneous, thereby obtaining an optical resin material.

The optical resin material was sandwiched between two glass plates together with a PET film having a thickness of 0.25 mm, and this was subjected to light irradiation for 10 minutes using a metal halide lamp (16 mW/cm$^2$, manufactured by Eye Graphics Co., Ltd.) to be cured, thereby obtaining a transparent resin plate having good low colorability. The refractive index of the obtained resin plate was measured, and the refractive index anomalous dispersion characteristics were evaluated. The results are shown in Table 1.

Example 23

(Preparation of Optical Element)

The optical resin material prepared in Example 22 was dropped on the concave surface of a glass lens (diameter: 70 mm, curvature radius: 400 mm), the convex surface of another glass lens (diameter: 70 mm, curvature radius: 480 mm) was pressed against it in a manner in which air bubbles did not enter with a PET film having a thickness of 0.1 mm being sandwiched between the end portions of the glass lenses, and it was subjected to light irradiation for 10 minutes using a metal halide lamp (16 mW/cm$^2$, manufactured by Eye Graphics Co., Ltd.) to be cured, thereby obtaining a composite optical element having good low colorability. The obtained composite optical element had good outer appearance, and there was no haze or separation of resin. Note that the glass lenses used were treated with a silane coupling agent (KBM-5103, manufactured by Shin-Etsu Chemical Co., Ltd.) in advance.

Examples 24-25

The operation was carried out in a manner similar to that in Example 1, except that the compounds used as the component A and the component B and the amounts thereof (% by mass) were as shown in Table 1, thereby obtaining a transparent resin plate having good low colorability. The refractive index of the obtained resin plate was measured, and the refractive index anomalous dispersion characteristics were evaluated. The results are shown in Table 1.

Comparative Examples 1-5

The operation was carried out in a manner similar to that in Example 1, except that the component A was not used or the amount of the component A was 3% by mass, thereby obtaining a transparent resin plate having good low colorability. The refractive index of the obtained resin plate was measured, and the refractive index anomalous dispersion characteristics were evaluated. In all the cases, $\Delta\theta g,F$ was less than 0.05. The results are shown in Table 1.

TABLE 1

|  | Component A | | Component B | | Optical characteristics | | | | |
| --- | --- | --- | --- | --- | --- | --- | --- | --- | --- |
|  | Compound | % by mass | Compound | % by mass | nd | vd | $\theta g,F$ | $\Delta\theta g,F$ | Yellowness |
| Example 1 | Tinuvin PS (A-3) | 5 | 1.6HX | 95 | 1.515 | 46.0 | 0.64 | 0.07 | good |
| Example 2 |  | 10 |  | 90 | 1.523 | 39.8 | 0.69 | 0.11 | good |
| Example 3 |  | 20 |  | 80 | 1.538 | 31.5 | 0.73 | 0.14 | good |
| Example 4 |  | 30 |  | 70 | 1.555 | 26.4 | 0.77 | 0.17 | good |
| Example 5 | Tinuvin 326 (A-4) | 10 |  | 90 | 1.516 | 44.2 | 0.67 | 0.10 | good |
| Example 6 |  | 20 |  | 80 | 1.525 | 37.2 | 0.74 | 0.16 | good |
| Example 7 | Tinuvin 329 (A-5) | 10 |  | 90 | 1.520 | 41.5 | 0.67 | 0.10 | good |
| Example 8 |  | 20 |  | 80 | 1.532 | 33.3 | 0.73 | 0.14 | good |
| Example 9 | Tinuvin 479 (A-6) | 10 |  | 90 | 1.524 | 37.4 | 0.68 | 0.10 | good |
| Example 10 |  | 20 |  | 80 | 1.541 | 29.3 | 0.74 | 0.15 | good |
| Example 11 | Tinuvin 571 (A-7) | 10 |  | 90 | 1.516 | 43.4 | 0.66 | 0.09 | good |
| Example 12 |  | 20 |  | 80 | 1.526 | 36.1 | 0.72 | 0.14 | good |
| Example 13 | Tinuvin PS (A-3) | 20 | EG | 80 | 1.542 | 30.5 | 0.73 | 0.14 | good |
| Example 14 |  |  | DGE-4A |  | 1.539 | 30.4 | 0.74 | 0.15 | good |
| Example 15 |  |  | F5710 |  | 1.629 | 22.1 | 0.71 | 0.10 | good |
| Example 16 | RUVA-93 (A-8) | 20 | 1.6HX | 80 | 1.536 | 33.5 | 0.72 | 0.13 | good |
| Example 17 |  |  | EG |  | 1.540 | 32.4 | 0.71 | 0.12 | good |
| Example 18 |  |  | F5710 |  | 1.626 | 22.9 | 0.69 | 0.09 | good |
| Example 19 | A-1 | 20 | 1.6HX | 80 | 1.534 | 38.2 | 0.63 | 0.06 | good |
| Example 20 |  | 42 |  | 58 | 1.564 | 29.1 | 0.68 | 0.09 | good |
| Example 21 | A-2 | 10 | EG | 90 | 1.525 | 42.8 | 0.64 | 0.07 | good |
| Example 22 | RUVA-93 (A-8) | 5 | 1.6HX | 95 | 1.538 | 46.1 | 0.62 | 0.05 | good |
| Example 24 | R18 homopolymer (A-9) | 5 | 1.6HX | 95 | 1.511 | 47.8 | 0.62 | 0.06 | good |
| Example 25 | S31 homopolymer (A-10) | 10 |  | 90 | 1.523 | 39.9 | 0.72 | 0.15 | good |
| Comparative Example 1 | — | — | 1.6HX | 100 | 1.506 | 54.7 | 0.56 | 0.01 | good |
| Comparative Example 2 |  |  | EG |  | 1.510 | 54.0 | 0.56 | 0.00 | good |
| Comparative Example 3 |  |  | DG-E-4A |  | 1.510 | 55.5 | 0.56 | 0.01 | good |
| Comparative Example 4 |  |  | F5710 |  | 1.619 | 26.5 | 0.62 | 0.02 | good |
| Comparative Example 5 | Tinuvin PS (A-3) | 3 | 1.6HX | 97 | 1.511 | 49.1 | 0.61 | 0.04 | good |

The invention claimed is:

1. An optical element obtained by curing an optical resin material for chromatic aberration correction, comprising 10% by mass or more of a compound (component A) represented by general formula (1) or general formula (3), and a polymerizable composition (component B); wherein the component A has at least one acryl group or methacryl group as a polymerizable group;

wherein the component B comprises at least one selected from the group consisting of 1,6-hexanediol dimethacrylate, ethylene glycol dimethacrylate, EO-modified diglycerin tetraacrylate, and fluorene acrylate:

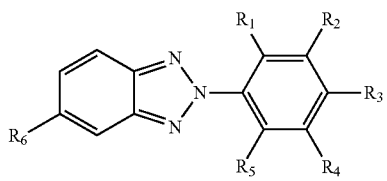
(1)

wherein $R_1$ to $R_6$ each independently represent a structure represented by general formula (2):

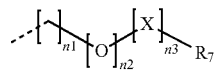
(2)

wherein:
the broken line represents a binding site;
n1 represents an integer of 0 to 3;
n2 represents an integer of 0 or 1;
n3 represents an integer of 0 to 4;
$R_7$ represents hydrogen, an acryl group, a methacryl group, a cyanoacryl group, a cyclic ether group, an allyl group, a propargyl group, a hydroxy group, an isocyanate group, chlorine, or an optionally branched alkyl group having 1 to 8 carbon atoms; and X represents an alkylene glycol chain having 2 to 7 carbon atoms or a lactone-modified ketone chain,

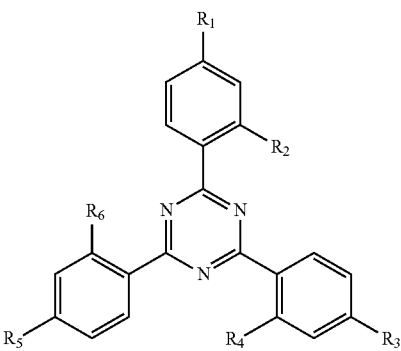
(3)

wherein $R_1$ to $R_6$ each independently represent a structure represented by general formula (2).

2. The optical element according to claim 1, wherein the component A is 2-[2-hydroxy-5-[2-(methacryloyloxy)ethyl]phenyl]-2H-benzotriazole or 3-(2H-benzotriazol-2-yl)-4-hydroxyphenyl methacrylate.

3. The optical element according to claim 1, wherein the ratio of the component A is 10 to 30% by mass.

4. The optical element according to claim 1, wherein the ratio of the component B is 50% by mass to 90% by mass.

5. The optical element according to claim 1, wherein at least one surface thereof is in contact with another optical element.

* * * * *